United States Patent Office 2,693,948
Patented Nov. 9, 1954

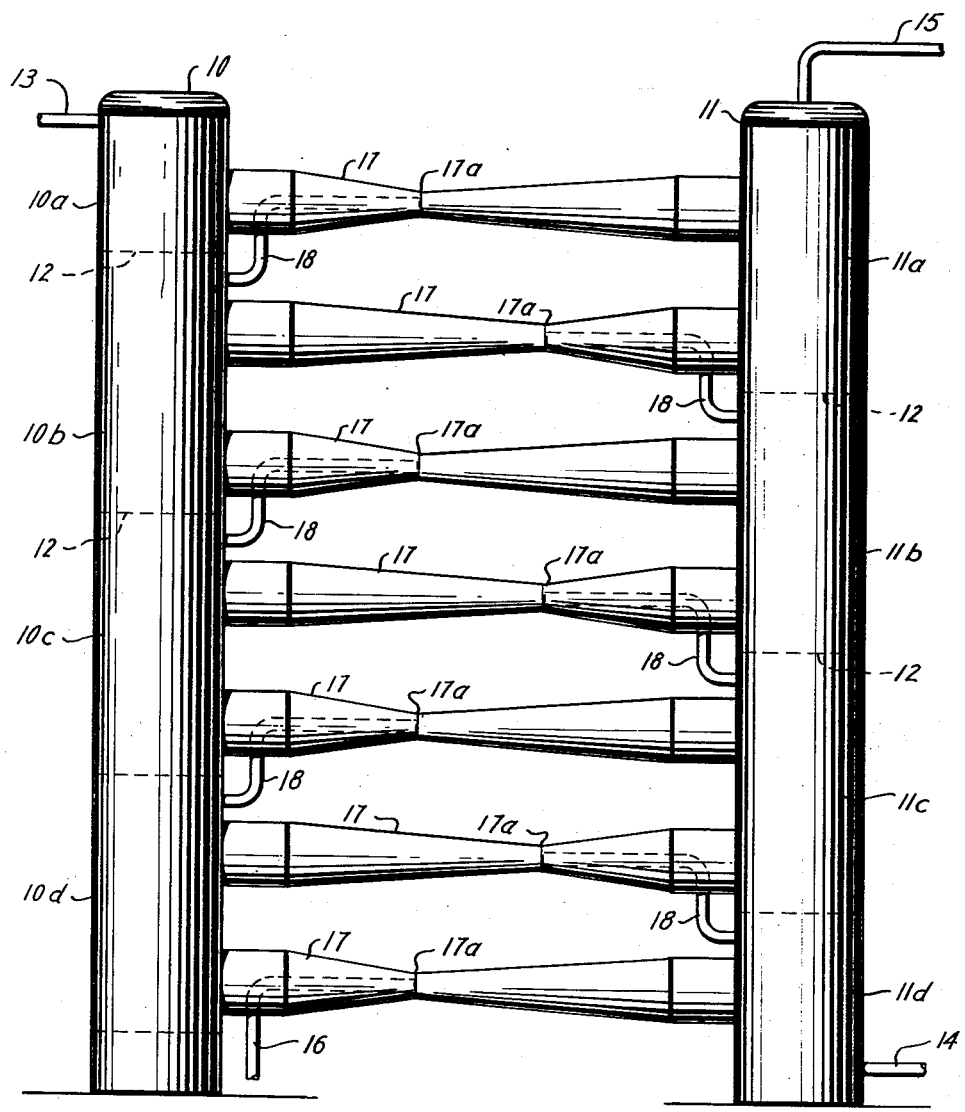

2,693,948

GAS AND LIQUID CONTACT APPARATUS

Nelson C. Turner, Houston, Tex., assignor to Hudson Engineering Corporation, Houston, Tex., a corporation of Texas Application January 18, 1950, Serial No. 139,232

3 Claims. (Cl. 261—21)

This invention relates to improvements in apparatus for contacting gases and liquid and refers more particularly to contacting gas and liquid at successively reduced pressure stages wherein the energy derived from the reduction of pressure of the predominant one of the fluids is utilized to create flow of the other of the fluids in a direction of increasing pressure.

In many processes, it is desirable to contact gases with liquids, as, for example, in absorption separation of the heavy hydrocarbons from natural gas, in the venting of a rich absorbent oil from a high pressure absorber, or the venting of crude oil or distillate from a high pressure separator in order to separate the liquid from the gas. It is desirable in such operations that the contact between gas and liquid be repeated at successively reduced pressures and that the non-predominant one of the gas and liquid streams be caused to flow in a direction of increasing pressure. The general object of this invention is to provide apparatus for accomplishing this wherein the energy derived from a decrease in pressure of the predominant one of the streams is utilized to create a flow of the other stream in the direction of increasing pressure.

As used in the specification and claims, the terms "upstream" and "downstream" are with reference to the direction of flow of the predominant fluid. Thus, for example, when the non-predominant fluid is said to flow "upstream," it is meant that it flows upstream with respect to the predominant fluid.

Another object of the invention is to provide apparatus for contacting gas and liquid at successive pressure reduction stages in which the energy derived from a decrease in pressure of one stream is utilized to create flow in the other stream in a direction of increasing pressure wherein the apparatus involved is simple, economical and without moving parts.

A further object is to provide apparatus for contacting gases and liquids wherein the contact takes place at successive pressure reduction stages and the fluids are separated in each stage and the non-predominant one of the separated fluids is caused to flow in an upstream direction by utilizing the energy derived from the pressure reduction of the other stream.

Still another object is to provide a gas and liquid contact apparatus wherein the energy derived from a reduction of pressure of the predominant one of the fluids is utilized to separate the gas and liquid in a plurality of stages.

A still further object is to provide a gas and liquid contact apparatus wherein the energy derived from a reduction of pressure of the predominant one of the fluids is utilized to separate the gas and liquid in a plurality of stages and to cause the non-predominant one of the fluids to flow in a direction of increasing pressure.

Yet another object is to provide a gas and liquid contact apparatus including an elongate conduit means having alternate enlarged and constricted flow portions wherein the flow characteristics of the passage is utilized to provide for intimate contact between the fluids at successive pressure reduction stages and the non-predominant one of the fluids is caused to flow in a direction of increasing pressure.

Yet a further object is to provide a gas and liquid contact apparatus wherein large volumes of fluids may be intimately contacted at successive pressure reduction stages at a high hourly capacity per unit weight of apparatus.

Other and further objects of the invention will appear from its description.

In the accompanying drawing, which forms a part of the instant specification, and is to be read in conjunction therewith:

The figure is a flow diagram illustrating apparatus embodying this invention.

This invention, in general, comprises an apparatus for contacting liquids and gases where the predominant one of the fluids is caused to flow through an elongate conduit means having alternate enlarged and constricted flow sections. The fluids are caused to separate in the enlarged sections due to gravity and the one of the fluids of least quantity, after separation, is then caused to flow into a constricted portion of the conduit means upstream of the enlarged section. The ratio of cross-sectional areas of the constrictions and enlargements is such that the pressure of the fluid flowing through each constriction is maintained less than the pressure of the fluids within enlarged sections downstream therefrom.

The secondary or non-predominant fluid may be introduced into the conduit means along with the predominant fluid, as where a high pressure liquid containing dissolved normally gaseous constituents is to be vented, or it may be introduced into the conduit means at any point upstream from the last downstream enlarged section and may be withdrawn from the conduit means, after scrubbing, at one of the enlarged sections adjacent the upstream end of the conduit means. Where the predominant fluid is gas and the fluid of least quantity is liquid, as for example in a high pressure absorber for the separation of certain hydrocarbons from a natural gas, the liquid preferably is introduced into the conduit means at some intermediate point along the flow passage and is withdrawn from the conduit means at another intermediate point but upstream from the liquid inlet. The introduction of the liquid at an intermediate point in the conduit means makes it possible to eliminate the mist from the flowing gas before its discharge from the apparatus and the liquid recovered from the mist then works its way upstream to the liquid outlet.

It is believed that the invention can be more readily understood by referring to the figure which illustrates the invention in its simplest form. The apparatus includes a tower system, which may be made up of two vertically arranged towers 10 and 11. A plurality of partitions 12 divides the system into a plurality of compartments. The compartments 10a, 10b, 10c and 10d of tower 10 are vertically arranged and the same is true of compartments 11a, 11b, 11c and 11d in the other tower.

This particular installation is especially adapted for contacting a high pressure oil with a relatively low pressure gas. For example, it may be used in venting rich oil from a high pressure absorber wherein it is desirable to contact a low pressure gas, from a low pressure stage of the same installation, for instance, the residue gas from a reabsorber. The oil inlet 13 communicates with compartment 10a and the oil leaves the system through outlet 14 communicating with compartment 11d. The gas leaves the system through line 15 communicating with compartment 11a and enters the system through line 16.

In this installation, the oil will be the predominant one of the fluids and the conduit means includes the various compartments of towers 10 and 11 and connections between alternate ones of these compartments. These connections include a plurality of conduits 17, each connected at their upstream end with the lower or liquid accumulation portion of one of the compartments of the two towers.

Their downstream end may communicate with any portion of the downstream one of the compartments. Each of the conduits 17 has constricted portions 17a and large cross-sectional portions adjacent the compartments. The compartments themselves provide gravity settlers for separating gases and liquids.

It will be understood that there has been provided an elongate conduit means including alternately arranged enlarged and constricted flow sections. The compartments of the towers 10 and 11 are included in the enlarged sections and provide gravity settlers for separating the gas from the liquid within the compartment. The ratio of the cross-sectional areas of constrictions 17a to that of the enlarged sections of the conduit means is such that the pressure of the fluid flowing through the constrictions is decreased to such extent as to be below the pressure of one of the downstream compartments in addition to that to which the particular conduit 17 discharges into. Preferably, the arrangement is such that the pressure within any constriction 17a, except the last downstream one, is less than the pressure within the second downstream compartment. Means is provided to place the constrictions 17a in communication with such downstream compartments. This means may be a plurality of conduits 18. The conduits 18 all communicate with that part of the compartment wherein the non-predominant one of the fluids accumulates. In this embodiment, the pipes 18 connect the upper portions of the compartments with the proper upstream constrictions in order to pass the gas from the compartment into the upstream constriction.

Where gas is to be introduced into the tower system other than that dissolved in the liquid, the gas inlet 16 may be employed communicating with the last downstream constriction 17a.

It is believed that the operation of this apparatus is apparent from the foregoing description. A predetermined pressure drop is maintained between the liquid inlet 13 and the liquid outlet 14. This drop in pressure is proportioned between the various compartments along the conduit means. The compartments' chief function is to provide gas liquid separators. Liquid from the bottom of each compartment flows from that compartment to the next downstream compartment and the gas from the compartments is conducted by the pipes 18 to the upstream constrictions 17a in the appropriate conduit 17. Thus, while the pressure is successively reduced on the liquid stream, the system serves as a pump and delivers the gas from outlet 15 at a higher pressure than is the gas at the inlet 16. At each stage of the injection of gas into the fluid flow at a constriction 17a, the gas and liquid are intimately contacted and then are separated in the accumulator compartments.

The scrubbing of the desired constituents from the gas is very effective due to the contact of the gas with the liquid at successively higher pressures. On the other hand, the liquid is completely vented due to the successive reduction of pressure in the separator sections of the conduit means.

An example of an operation using this equipment will be helpful in understanding its operation. A rich oil from an absorber, at a pressure of one thousand pounds, is injected into the tower system through conduit 13. This oil may be from a high pressure absorber, and it is desired to vent the oil at successively reduced pressure stages to eliminate dissolved methane and to scrub released gas, by contact with the liquid itself at successively higher pressures. Another gas to be treated in the system is introduced through pipe 16 at a pressure of 350 pounds. The cross-sectional size of constrictions 17a of the conduit 17 are selected to maintain the pressures within compartments of towers 10 and 11, at the rate of charge of oil into the system, as follows:

| | P. s. i. |
|---|---|
| Compartment 10a | 1,000 |
| Compartment 10b | 850 |
| Compartment 10c | 750 |
| Compartment 10d | 650 |
| Compartment 11a | 950 |
| Compartment 11b | 800 |
| Compartment 11c | 700 |
| Compartment 11d | 600 |

It will be seen that this system not only provides the advantage of an efficient and economical contact apparatus, but that it also delivers the outlet gas at 950 p. s. i. where it was introduced into the system at 350 p. s. i. Thus, low pressure gas such as residue gas from a low pressure absorber can be scrubbed of any entrained desirable constituents and delivered at a sufficient pressure to be introduced into a gas transit system without further compression.

From the foregoing it will be seen that this invention is one well adapted to attain all of the ends and objects hereinabove set forth together with other advantages which are obvious and which are inherent to the structure and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limting sense.

The invention having been described, what is claimed is:

1. Gas and liquid contact apparatus comprising two vertical towers, a liquid inlet adjacent the top of one tower, a liquid outlet adjacent the lower end of the other tower, a gas outlet adjacent the top of the other tower, partitions dividing the towers into a plurality of superposed compartments, conduit means for conducting liquid from the liquid inlet compartment to the liquid outlet compartment of the other tower and alternately including the compartments of the two towers, said means adapted to conduct the liquid accumulated in the included compartments to the next downstream compartment, except for the liquid outlet compartment, a flow restriction in the conduit means between each set of compartments adapted to reduce the pressure therein to less than the pressure in the second compartment downstream therefrom, and means providing communication between the upper portion of all but the liquid inlet and gas outlet compartments with the constriction of the conduit means discharging into the next upstream compartment.

2. Gas and liquid contact apparatus comprising a plurality of vertical towers, at least one compartment in each tower, a liquid inlet adjacent the top of one compartment, a liquid outlet adjacent the lower end of another compartment, a gas outlet adjacent the top of still another compartment, conduit means for conducting liquid from the liquid inlet compartment to the liquid outlet compartment and through the remaining compartments, said means being adapted to pass liquid accumulated in each of the compartments except the liquid outlet compartment to the compartment next downstream therefrom, a flow restriction in the conduit means between compartments adapted to reduce the pressure therein to less than the pressure of the compartment second downstream therefrom, and means providing communication between the upper portion of all but the liquid inlet and gas outlet compartments with the constriction of the conduit means passing into the next upstream compartment.

3. Gas and liquid contact apparatus comprising two vertical towers, a liquid inlet adjacent the top of one tower, a liquid outlet adjacent the lower end of the other tower, a gas outlet adjacent the top of the other tower, partitions dividing the towers into a plurality of superposed compartments, conduit means for conducting liquid from the liquid inlet compartment to the liquid outlet compartment of the other tower and alternately including the compartments of the two towers, said means adapted to conduct the liquid accumulated in the included compartments to the next downstream compartment, except for the liquid outlet compartment, a venturi tube provided with a throat in the conduit means between each set of compartments, and means connecting the upper portion of all but the liquid inlet and gas outlet compartments to the throat of the conduit means discharging into the compartment next upstream therefrom, said connecting compartments and throats having cross-sectional areas of a predetermined ratio such as to reduce the pressure at said throat to less than the pressure within said compartment.

References Cited in the file of this patent

UNITED STATES PATENTS

| Number | Name | Date |
|---|---|---|
| 1,803,956 | Bergman | May 5, 1931 |
| 1,863,192 | Doble | June 14, 1932 |
| 2,020,850 | Myhren et al. | Nov. 12, 1935 |
| 2,180,888 | Underwood | Nov. 21, 1939 |
| 2,230,210 | Brecour et al. | Jan. 28, 1941 |
| 2,299,130 | Dill | Oct. 20, 1942 |
| 2,345,667 | Hachmuth | Apr. 4, 1944 |
| 2,521,215 | Haddeland et al. | Sept. 5, 1950 |